Sept. 29, 1931. W. A. WINDER 1,824,941
HOOK
Filed Nov. 20, 1929
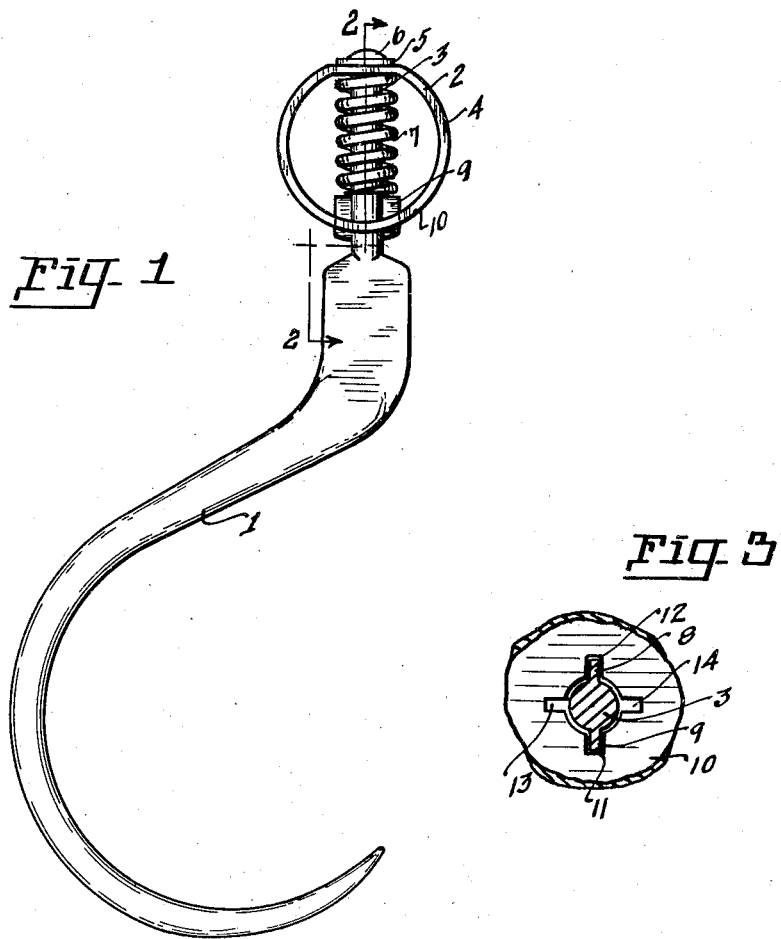
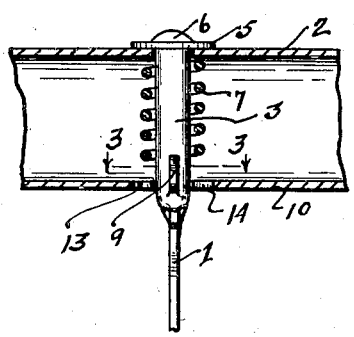
William A. Winder
INVENTOR
BY
ATTORNEY Patented Sept. 29, 1931

1,824,941

UNITED STATES PATENT OFFICE

WILLIAM A. WINDER, OF PORTLAND, OREGON, ASSIGNOR OF ONE-THIRD TO FRANCIS JOSEPH WINDER, OF PORTLAND, OREGON

HOOK

Application filed November 20, 1929. Serial No. 408,533.

My new and improved hook is intended for use by longshoremen, draymen, shipping clerks and others that are required to handle boxes, bales, bundles, baled hay and the like.

It has for its object the facilitating of the carrying of the hook in the pocket or upon the belt of the user, when not in use.

The invention consists primarily of a handle member having a hook associated therewith and having means for turning the hook relative to the handle so that the hook and the handle will lie in a common plane.

Means are provided within the handle for the swiveling of the hook relative to the handle and for maintaining the hook locked in position relative to that of the handle.

A further object of my invention consists in providing a hook swivelably secured to the handle and having means for locking the hook relative to the handle when being used and for turning the hook relative to the handle so that the two will lie in a common plane when not in use to facilitate the carrying of the assembly.

A further object of my invention consists in providing simple means for the locking of the hook relative to the handle and for the unlocking of the hook relative to the handle to facilitate the swiveling of the hook relative to the handle.

With these and incidental objects in view, the invention consists in certain novel features of construction and combination of parts, the essential elements of which are set forth in the appended claim, and a preferred form of embodiment of which is hereinafter shown with reference to the drawings which accompanying and form a part of this specification.

In the drawings:

Fig. 1 is a side view of the hook illustrating the handle in end view. The dotted lines illustrate the handle turned relative to the hook so that the two will lie in a common plane.

Fig. 2 is a fragmentary, sectional, side view of the mechanism illustrated in Fig. 1, the same being taken on line 2—2 of Fig. 1 looking in the direction indicated.

Fig. 3 is a fragmentary, sectional, plan view of the hook shank and the handle, the same being taken on line 3—3 of Fig. 2 looking in the direction indicated.

Like reference characters refer to like parts throughout the several views.

1 is a conventional hook member commonly used by longshoremen, draymen, shipping clerks, and the like. The common practice for hooks now in use is to secure a handle 2 fixedly positioned upon the shank portion 3 of the hook. The handle is disposed at right angles to that of the body portion of the hook. It is necessary to maintain the handle at right angles to that of the body portion of the hook, when the same is in use, in order to facilitate the use of the hook by the user; but when it is desired to place the hook in the pocket or secure the same upon the belt of the workmen, it is desirable to turn the handle relative to the hook so that the hook and the handle will lie in common plane. The upper end of the hook terminates in a shank 3 and passes through the upper portion 4 of the handle member. I have found good results may be obtained where a washer 5 is placed between the peened head 6 of the shank and the upper portion of the handle to facilitate the turning of the hook relative to that of the handle. A compression spring 7 normally maintains the hook in working position relative to that of the handle. Slots 8 and 9 are disposed within a straight line within the lower surface 10 of the handle and lugs 11 and 12 are normally positioned within the slots 8 and 9 for maintaining the hook outwardly distended relative to that of the handle. When it is found desirable to turn the handle so that the handle and the hook body will lie in a common plane the shank 3 is pushed upward within and through the walls of the handle until the lugs 11 and 12 are clear of the slots 8 and 9, in which position the shank may be turned until the lugs 11 and 12 come in registerable alignment with the slots 13 and 14 at which time the pressure is released and the spring returns the shank to normal position.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What I claim is:

A hook comprising a hook element having a shank disposed at its handle receiving end, of a handle rotatably disposed about the shank, a plurality of slits disposed within the side wall of the handle, lugs outwardly extending from the shank and adapted to engage within the slits, a compressible element disposed about the shank for normally maintaining the lugs in registerable engagement with the slits and means for locking or unlocking the handle relatively to the shank to facilitate the turning of the handle, said means including the lugs and slits.

WILLIAM A. WINDER.